United States Patent
Kendall et al.

[11] 3,795,390
[45] Mar. 5, 1974

[54] SHOCK ABSORBER DEVICE

[75] Inventors: Giles A. Kendall, Burbank; Harish K. Bhutani, Downey, both of Calif.

[73] Assignee: Menasco Manufacturing Company, Burbank, Calif.

[22] Filed: June 9, 1972

[21] Appl. No.: 261,416

[52] U.S. Cl. ............... 267/33, 213/43, 213/45, 267/34, 267/35
[51] Int. Cl. ......................... F16f 3/10, F16f 3/07
[58] Field of Search ........... 267/22, 35, 33, 34, 152; 213/40 R, 40 D, 40 S, 43, 44, 45

[56] References Cited
UNITED STATES PATENTS

| | | | |
|---|---|---|---|
| 2,818,249 | 12/1957 | Boschi | 267/33 |
| 38,642 | 5/1863 | Vose | 267/33 |
| 3,225,707 | 12/1965 | Rollins et al. | 213/43 |

*Primary Examiner*—Gerald M. Forlenza
*Assistant Examiner*—Robert Saifer

[57] ABSTRACT

A shock absorber having a helical coil spring and elastomeric material intermediate the coils of the coil spring to form a dual spring unit which with end members defines a closed chamber that is filled with a dampening medium. Arranged within the chamber is a hydraulic assembly acting in parallel with the dual spring unit.

3 Claims, 4 Drawing Figures

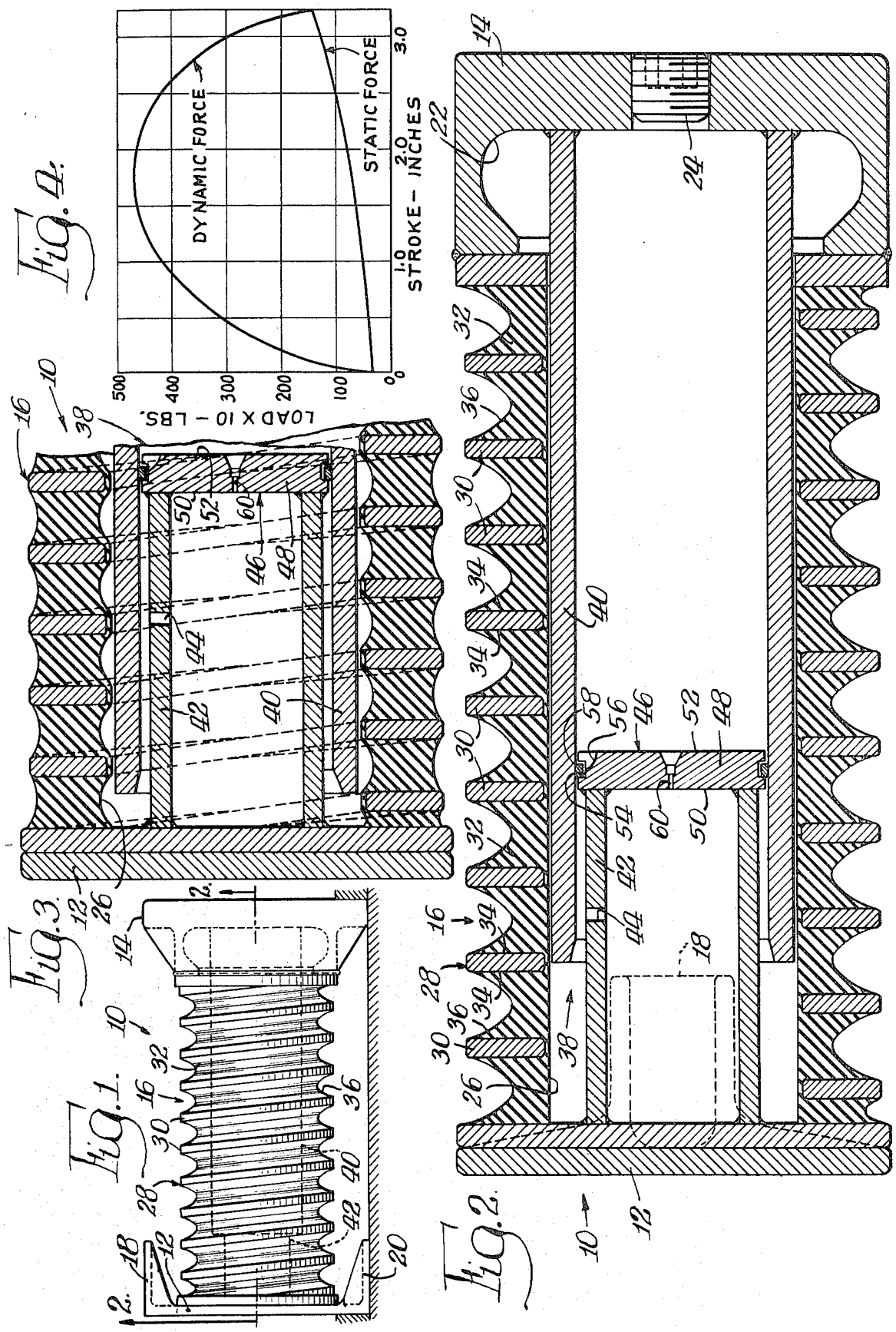

SHOCK ABSORBER DEVICE

FIELD OF THE INVENTION

The present invention pertains generally to a shock absorber device which is suitable, for example, for use in railroad car sway dampening systems, truck and trailer suspension systems, missile shock isolation systems, and aircraft landing gear systems.

SUMMARY OF THE INVENTION

The present invention is concerned with a shock absorber device which incorporates a mechanical spring, an elastomeric spring, and a hydraulic damper.

More particularly, elastomeric material is bonded to and intermediate of the coils of a metal helical coil spring to form a dual spring unit. End members are secured to the dual spring unit whereby a closed elongated axial chamber is defined and the chamber is filled with a flowable dampening medium. When the dual spring unit is axially compressed, the elastomeric material is displaced generally radially outwardly by the dampening medium, and the coil spring and elastomeric material, acting in parallel, serve to absorb and dissipate compressive shock forces.

In addition, a hydraulic piston and cylinder assembly, comprising a cylinder or pressure tube, a piston rod, and a piston head assembly with associated orifice or metering port means, is arranged within the closed chamber. When the shock absorber is axially compressed, the hydraulic assembly, acting in parallel with the dual spring unit, serves to absorb and dissipate compressive shock forces.

BRIEF DESCRIPTION OF THE DRAWING

FIG. 1 is a side elevational view of a shock absorber device incorporating the principles of the present invention;

FIG. 2 is a horizontal median sectional view of the device of FIG. 1, on an enlarged scale, taken substantially along the line 2—2 in FIG. 1, looking in the direction indicated by the arrows;

FIG. 3 is a partial horizontal median sectional view corresponding generally to FIG. 2, but showing the device compressed under load conditions; and FIG. 4 is a graph showing the force-distance curves of a shock absorber device incorporating the principles of the present invention.

DESCRIPTION OF THE PREFERRED EMBODIMENT

Referring now to FIGS. 1 and 2, there is indicated generally by the reference numeral 10 a shock absorber or force attenuating device which may, for example, be disposed horizontally as shown, and utilized as a sway damper in a railroad car.

The shock absorber 10 comprises a head member 12, a base member 14 and an intermediate dual spring unit 16. The head member 12 has top and bottom flange portions 18 and 20, while the base member 14 is formed with an axial recess 22 and is provided with a removable filler plug 24. The dual spring unit 16 has secured to its ends the head and base members 12 and 14, and defines therewith a closed elongated axial chamber 26.

The dual spring unit 16 includes a metal helical coil spring 28 having a plurality of coils 30, and elastomeric material 32, such as rubber or an equivalent, intermediate the coils 30. The coils 30 are transversely oblong or rectangular in cross-section, and present transverse sides 34. The elastomeric material 32 is suitably bonded at least to the transverse sides 34 of the coils 30.

Disposed within the closed chamber 26 is a hydraulic piston and cylinder assembly 38. The assembly 38 comprises an axial cylinder or pressure tube 40 having one end secured to the base member 14 interiorly of the axial recess 22. An axial hollow piston rod 42 is arranged in telescoping relation to the cylinder 40. One end of the piston rod 42 is secured to the head member 12, and the other end of the piston rod 42 projects into the cylinder 40. Formed in the side of the piston rod 42 is a bleed port 44.

Mounted for axial movement within the cylinder 40 is a piston head assembly 46 which includes a piston portion 48 presenting a rearward side 50 secured to the adjacent end of the piston rod 42, and a forward side 52. The piston 48, at its outer periphery, is formed with an annular groove 54 which communicates with one or more axial slots 56 opening at the forward side 52. Arranged within the piston groove 54 is a floating piston ring 58 which is narrower than the width of the groove 54. Associated with the piston head assembly 46 is orifice means preferably in the form of a central axial orifice or metering port 60 extending through the piston 48. After the various elements of the shock absorber device 10 have been assembled, the closed chamber 26 or interior of the device is completely filled with a flowable dampening medium such as hydraulic fluid. The piston head assembly 46 serves to divide the chamber 26 into a low pressure chamber section and into a high pressure chamber section interiorly of the cylinder 40.

In the operation of the shock absorber device 10, compressive shock forces applied to the device cause the head and base members 12 and 14 to move relatively toward each other. Concurrently, the dual spring unit 16 is axially compressed, the closed chamber 26 is axially foreshortened, and the elastomeric material 32 is displaced generally radially outwardly, from the position shown in FIG. 2 to the position shown in FIG. 3, by the dampening medium. As a consequence, the coil spring 28 and the elastomeric material 32, acting in parallel, serve to absorb and dissipate the compressive shock forces.

Also, under the influence of compressive shock forces applied to the device 10, the piston head assembly 46 is urged relatively toward the base member 14. As such relative movement of the assembly 46 commences, pressure initially built up in the dampening medium within the cylinder 40 causes the floating piston ring 58 to be forced into abutment with the rearward side of the annular groove 54 thereby preventing dampening medium from flowing past the periphery of the piston 48. During such relative movement of the assembly 46, the dampening medium is forced outwardly of the cylinder 40 through the orifice 60. The orifice 60 serves to restrict or meter the flow of dampening medium from the interior of the cylinder 40 or high pressure chamber section to the remainder of chamber 26 or low pressure chamber section during force attenuation. By metering the displacement of dampening medium from the cylinder 40 in the manner described, the hydraulic assembly 38, acting in parallel with the dual spring unit 16, serves to absorb and dissipate the compressive forces. The shock absorber device 10 has high energy absorption or dissipation characteristics, and the force-distance curves shown in FIG. 4 are representative of a device 10 suitable for a typical railroad application.

When the compressive force is removed from the device 10, the dual spring unit 16 serves to return the relatively movable components from the position shown in FIG. 3 to the normal rest position shown in FIG. 2. During such return motion, the floating piston ring 58 abuts the forward side of the annular groove 54 thereby permitting the flow of dampening medium past the piston 48 through the axial slot 56. The elastomeric material 32 not only serves as a spring but also provides a leak-proof housing for the device whereby to prevent the escape of dampening medium.

While there has been shown and described what is believed to be a preferred embodiment of the present invention, it will be understood by those skilled in the art that various rearrangements and modifications may be made therein without departing from the spirit and scope of the invention.

The invention claimed is:

1. A shock absorber device comprising a dual spring unit including a mechanical spring and an elastomeric spring, said mechanical spring being comprised of a helical coil spring having a plurality of coils which are transversely oblong in cross-section and present transverse sides, said elastomeric spring being comprised of elastomeric material intermediate said coils of said coil spring and bonded at least to the transverse sides of said coils, a head member secured to one end of said dual spring unit, a base member secured to the other end of said dual spring unit, said dual spring unit and said head member and said base member defining a closed elongated axial chamber, a flowable dampening medium filling said chamber, said dual spring unit being axially compressed and said elastomeric spring being displaced generally radially outwardly by said dampening medium in response to movement of said head member and said base member relatively toward each other to absorb and dissipate compressive shock forces applied to said device, an axial cylinder within said chamber having one end secured to said base member, an axial piston rod within said chamber having one end secured to said head member and the other end projecting into said cylinder, a piston head assembly secured to said other end of said piston rod and axially movable within said cylinder, and orifice means to restrict the flow of said dampening medium from the interior of said cylinder to the remainder of said chamber as said piston head assembly moves toward said base member in said cylinder.

2. A shock absorber device comprising a dual spring unit including a mechanical spring and an elastomeric spring, a head member secured to one end of said dual spring unit, a base member secured to the other end of said dual spring unit, said dual spring unit and said head member and said base member defining a closed elongated axial chamber, a flowable dampening medium filling said chamber, said dual spring unit being axially compressed and said elastomeric spring being displaced generally radially outwardly by said dampening medium in response to movement of said head member and said base member relatively toward each other to absorb and dissipate compressive shock forces applied to said device, an axial cylinder within said chamber having one end secured to said base member, an axial piston rod within said chamber having one end secured to said head member and the other end projecting into said cylinder, a piston head assembly secured to said other end of said piston rod and axially movable within said cylinder, and orifice means associated with said piston head assembly to restrict the flow of said dampening medium from the interior of said cylinder to the remainder of said chamber as said piston head assembly moves toward said base member in said cylinder.

3. A shock absorber device comprising a dual spring unit including a mechanical spring and an elastomeric spring, a head member secured to one end of said dual spring unit, a base member secured to the other end of said dual spring unit, said dual spring unit and said head member and said base member defining a closed elongated axial chamber, a flowable dampening medium filling said chamber, said dual spring unit being axially compressed and said elastomeric spring being displaced generally radially outwardly by said dampening medium in response to movement of said head member and said base member relatively toward each other to absorb and dissipate compressive shock forces applied to said device, an axial cylinder within said chamber having one end secured to said base member, an axial hollow piston rod within said chamber having one end secured to said head member and the other end projecting into said cylinder, said hollow piston rod having a bleed port formed in the side thereof, a piston head assembly secured to said other end of said piston rod and axially movable within said cylinder, said piston head assembly serving to divide said chamber into a low pressure chamber section and into a high pressure chamber section interiorly of said cylinder, and said piston head assembly having a central axial orifice to restrict the flow of said dampening medium from said high pressure chamber section to said low pressure chamber section during force attenuation.

* * * * *